United States Patent
Lu

(10) Patent No.: US 11,830,400 B2
(45) Date of Patent: Nov. 28, 2023

(54) CIRCUIT STRUCTURE, METHOD FOR DRIVING THE SAME, AND DISPLAY APPARATUS

(71) Applicant: Shanghai Tianma Micro-Electronics Co., Ltd., Shanghai (CN)

(72) Inventor: Feng Lu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/835,318

(22) Filed: Jun. 8, 2022

(65) Prior Publication Data

US 2022/0301477 A1 Sep. 22, 2022

(30) Foreign Application Priority Data

Mar. 22, 2022 (CN) .......................... 202210288280.5

(51) Int. Cl.
*G09G 3/32* (2016.01)
*G09G 3/20* (2006.01)

(52) U.S. Cl.
CPC ....... *G09G 3/20* (2013.01); *G09G 2300/0426* (2013.01); *G09G 2300/0819* (2013.01); *G09G 2300/0842* (2013.01); *G09G 2300/0861* (2013.01); *G09G 2310/0286* (2013.01); *G09G 2320/0233* (2013.01)

(58) Field of Classification Search
CPC .................. G09G 3/367; G09G 3/3266; G09G 2310/0286; G09G 2310/0267
See application file for complete search history.

(56) References Cited

U.S. PATENT DOCUMENTS

| 8,059,116 | B2* | 11/2011 | Ishizuka | G09G 3/3258 345/73 |
| 9,851,776 | B2* | 12/2017 | Toyotaka | G06F 1/1641 |
| 2002/0190942 | A1* | 12/2002 | Lee | G09G 3/3648 345/96 |
| 2005/0179625 | A1* | 8/2005 | Choi | G09G 3/3233 345/76 |
| 2006/0227094 | A1* | 10/2006 | Park | G09G 3/3677 345/100 |
| 2010/0188375 | A1* | 7/2010 | Lee | G09G 3/3266 345/204 |
| 2013/0069852 | A1* | 3/2013 | Liao | G09G 3/3233 345/77 |

(Continued)

*Primary Examiner* — Sepehr Azari
(74) *Attorney, Agent, or Firm* — CHRISTENSEN O'CONNOR JOHNSON KINDNESS PLLC

(57) ABSTRACT

A circuit structure, a method for driving the same, and a display apparatus are provided. The circuit structure includes shift units and a control circuit. The shift units are cascaded and include first to third shift units. The control circuit includes a first control unit and a second control unit. The first control unit is electrically connected between the first shift unit and the second shift unit, and is configured to control a shift control signal output by the first shift unit to be transmitted to the second shift unit when the first control unit is turned on. The second control unit is electrically connected between the second shift unit and the third shift unit, and is configured to control a shift control signal output by the second shift unit to be transmitted to the third shift unit when the second control unit is turned on.

16 Claims, 15 Drawing Sheets

(56) References Cited

U.S. PATENT DOCUMENTS

| | | | |
|---|---|---|---|
| 2014/0160093 A1* | 6/2014 | Chaji | G09G 3/3291 |
| | | | 345/204 |
| 2016/0351124 A1* | 12/2016 | Kim | G09G 3/3291 |
| 2018/0137805 A1* | 5/2018 | Zheng | G09G 3/20 |
| 2019/0385517 A1* | 12/2019 | Zeng | G09F 9/301 |
| 2020/0357362 A1* | 11/2020 | Shin | G09G 3/035 |
| 2021/0174716 A1* | 6/2021 | Noh | G06F 3/1431 |
| 2021/0217339 A1* | 7/2021 | Zheng | G09G 3/2092 |

* cited by examiner

CIRCUIT STRUCTURE, METHOD FOR DRIVING THE SAME, AND DISPLAY APPARATUS

CROSS-REFERENCE TO RELATED APPLICATION

The present application claims priority to Chinese Patent Application No. 202210288280.5, filed on Mar. 22, 2022, the content of which is incorporated herein by reference in its entirety.

TECHNICAL FIELD

The present disclosure relates to the field of display technologies, and, particularly, relates to a circuit structure, a method for driving the same, and a display apparatus.

BACKGROUND

With the continuous development of display technologies, a display apparatus has more and more abundant and diverse functions. However, in the related art, it is difficult for a shift circuit in the display apparatus to achieve the diverse functions, which adversely affects further optimization of the performance of the display apparatus.

SUMMARY

In a first aspect of the present disclosure, a circuit structure is provided. The circuit structure includes shift units and a control circuit. The shift units are cascaded and include a first shift unit, a second unit, and a third shift unit. The control circuit includes a first control unit and a second control unit. The first control unit is electrically connected between the first shift unit and the second shift unit, and is configured to control a shift control signal output by the first shift unit to be transmitted to the second shift unit when the first control unit is turned on. The second control unit is electrically connected between the second shift unit and the third shift unit, and is configured to control a shift control signal output by the second shift unit to be transmitted to the third shift unit when the second control unit is turned on.

In a second aspect of the present disclosure, a method for driving a circuit structure. The circuit structure includes shift units and a control circuit. The shift units are cascaded and include a first shift unit, a second unit, and a third shift unit. The control circuit includes a first control unit and a second control unit. The first control unit is electrically connected between the first shift unit and the second shift unit, and is configured to control a shift control signal output by the first shift unit to be transmitted to the second shift unit when the first control unit is turned on. The second control unit is electrically connected between the second shift unit and the third shift unit, and is configured to control a shift control signal output by the second shift unit to be transmitted to the third shift unit when the second control unit is turned on. The method includes controlling the shift units to output scanning signals. At the first time point, one of the first control unit and the second control unit is turned on, and another one of the first control unit and the second control unit is turned off. When the first control unit is turned on and the second control unit is turned off, the first control unit is configured to control the shift control signal output by the first shift unit to be transmitted to the second shift unit in such a manner that the second shift unit outputs a driving signal in turn, and the second control unit is configured to control the shift control signal output by the second shift unit not to be transmitted to the third shift unit.

In a third aspect of the present disclosure, a display apparatus is provided. The display apparatus includes a circuit structure. The circuit structure includes shift units and a control circuit. The shift units are cascaded and include a first shift unit, a second unit, and a third shift unit. The control circuit includes a first control unit and a second control unit. The first control unit is electrically connected between the first shift unit and the second shift unit, and is configured to control a shift control signal output by the first shift unit to be transmitted to the second shift unit when the first control unit is turned on. The second control unit is electrically connected between the second shift unit and the third shift unit, and is configured to control a shift control signal output by the second shift unit to be transmitted to the third shift unit when the second control unit is turned on.

BRIEF DESCRIPTION OF DRAWINGS

In order to better illustrate technical solutions of embodiments of the present disclosure, the accompanying drawings used in embodiments are briefly described below. The drawings described below are merely a part of the embodiments of the present disclosure. Based on these drawings, those skilled in the art can obtain other drawings.

DESCRIPTION OF EMBODIMENTS

In order to better understand the technical solutions of the present disclosure, the embodiments of the present disclosure are described in detail below. Referring to the accompanying drawings.

It should be clear that the described embodiments are only some embodiments of the present disclosure, but not all of the embodiments. Based on the embodiments in the present disclosure, all other embodiments obtained by those of ordinary skill in the art without creative efforts fall within the protection scope of the present disclosure.

The terms used in the embodiments of the present disclosure are only for the purpose of describing specific embodiments, and are not intended to limit the present disclosure. As used in the embodiments of this application and the appended claims, the singular forms "a/an" "the" and "said" are intended to include the plural forms as well, unless the context clearly dictates otherwise.

It should be understood that the term "and/or" used in this document is only an association relationship to describe the associated objects, indicating that there can be three relationships, for example, A and/or B, which can indicate that A alone, A and B, and B alone. The character "/" in this document generally indicates that the related objects are an "or" relationship.

A display apparatus has a functional region for displaying images or recognizing fingerprint. Multiple functional circuits are arranged in the functional region.

In a research process, a display apparatus that performs partition control for a functional region in the related art is studies. It is found that, in a panel structure in the related art, driving signal lines electrically connected to functional circuits in different rows are usually connected to a same shift unit. However, based on such connection, when controlling different regions of a display panel, a last row of functional circuits in each functional sub-region cannot achieve its complete function, thereby adversely affecting the display effect or the fingerprint recognition effect.

Figure 1:
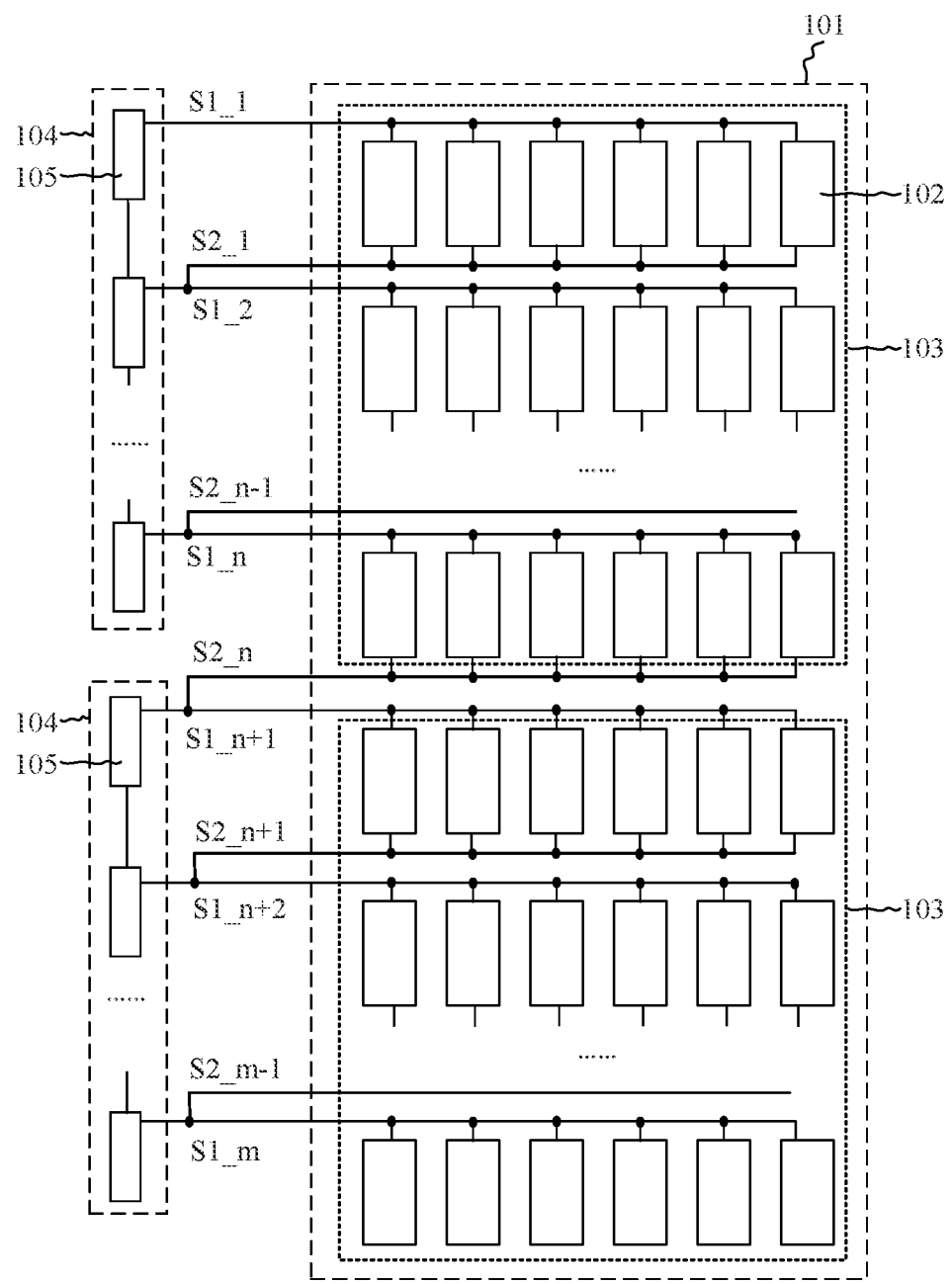
FIG. 1 is a top view of a display apparatus in the related art.

FIG. 1 is a top view of a display apparatus in the related art. As shown in FIG. 1, the display apparatus includes a functional region 101. The functional region 101 includes multiple functional circuits 102 that are arranged in a matrix. The functional region 101 can include a recognizing functional region for fingerprint recognition. A functional circuit in the recognizing functional region is a photosensitive circuit. The functional region 101 can also include a display functional region for displaying images. A functional circuit in the display functional region is a pixel circuit.

The functional circuit 102 is electrically connected to a first driving signal line S1 and a second driving signal line S2. The functional circuit 102 is configured to perform a first operation under a first driving signal, and perform a second operation under a second driving signal. To understand easily, in FIG. 1, the first driving signal line S1 electrically connected to the functional circuit 102 in an $i^{th}$ row is denoted by a reference numeral S1_$i$, and the second driving signal line S2 electrically connected to the functional circuit 102 of the $i^{th}$ row is denoted by a reference numeral S2_$i$.

Exemplarily, when the functional circuit 102 is a photosensitive circuit, the first driving signal line S1 is a read control signal line, the second driving signal line S2 is a reset control signal line. The photosensitive circuit is configured to perform a read operation under a read control signal, and perform a reset operation under a reset control signal. When the functional circuit 102 is a pixel circuit, the first driving signal line S1 is a first scanning signal line, the second driving signal line S2 is a second scanning signal line. The pixel circuit is configured to perform a reset operation under a first scanning signal, and perform a data writing operation under a second scanning signal.

The display apparatus includes multiple cascaded shift units 105 for providing driving signals to the functional circuit 102. In a panel design in the related art, the driving signals required by two adjacent rows of the functional circuits 102 are provided by a same shift unit 105. For example, the $i^{th}$ shift unit 105 is electrically connected to the $i^{th}$ row of functional circuits 102 through the first driving signal line S1_$i$, and is also connected to an $(i-1)^{th}$ row of functional circuits 102 through a second driving signal line S2_$i$-1. That is, the driving signal output by the $i^{th}$ shift unit 105 not only serves as the first driving signal of the $i^{th}$ row of functional circuits 102 configured to control the $i^{th}$ row of functional circuits 102 to perform the first operation, but also serves as the second driving signal of the $(i-1)^{th}$ row of functional circuits 102 configured to control the $(i-1)^{th}$ row of functional circuits 102 to perform the second operation.

When the driving signals required by two adjacent rows of functional circuits 102 are provided by a same shift unit 105, the driving signals provided by the shift units 105 can have different functions in the two adjacent rows of functional circuits 102. For example, in combination with the above description, when the functional circuit 102 is a photosensitive circuit, for a previous row of functional circuits 102, the driving signal provided by the shift unit 105 serves as a read control signal (first driving signal) to drive this row of functional circuits 102 to perform the read operation. For a next row of functional circuits 102, the driving signal serves as a reset control signal (second driving signal) to drive this row of functional circuits 102 to perform the reset operation. When the functional circuit 102 is a pixel circuit, for a previous row of functional circuits 102, the driving signal provided by the shift unit 105 serves as a first scanning signal (first driving signal) to drive this row of functional circuits 102 to perform a reset operation. For a next row of functional circuits 102, the driving signal serves as a second scanning signal (second driving signal) to drive this row of functional circuits 102 to perform a data writing operation.

In order to achieve flexible control of different regions of the functional region 101, referring to FIG. 1 again, the functional region 101 is divided into multiple functional sub-regions 103. Each functional sub-region 103 includes multiple rows of functional circuits 102. Correspondingly, the display apparatus is provided with multiple shift circuits 104 corresponding to multiple functional sub-regions 103 in one-to-one correspondence. Each shift circuit 104 includes multiple cascaded shift units 105. When a functional sub-region 103 is controlled to work individually, it is required to only control the shift circuit 104 corresponding to the functional sub-region 103 to work, so that the shift unit 105 in the shift circuit 104 outputs driving signals in sequence.

However, according to the above description of the connection between the functional circuit 102 and the shift unit 105, it can be seen that when a certain functional sub-region 103 is controlled to work individually, the second driving signal required by the last row of functional circuits 102 in the functional sub-region 103 is required to be provided by the shift unit 105 corresponding to the first row of functional circuits 102 in the next functional sub-region 103. Since the shift circuit 104 corresponding to the next functional sub-region 103 does not work, the last row of functional circuits 102 in the functional sub-region 103 cannot receive the second driving signal, i.e., the second operation cannot be performed, so that the last row of the functional circuit 102 does not perform functions completely.

Figure 2:
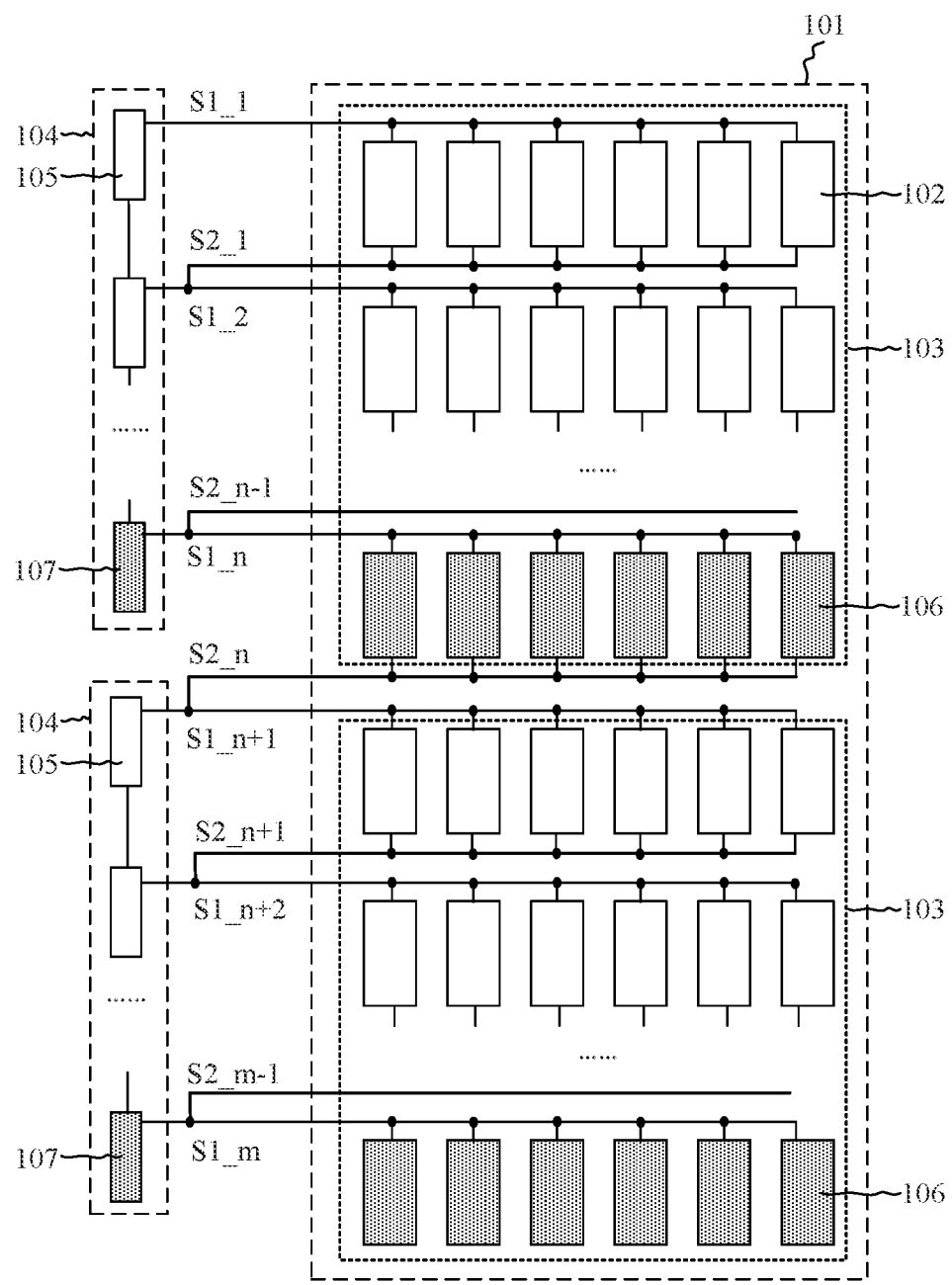
FIG. 2 is a top view of a display apparatus according to some embodiments of the present disclosure.

FIG. 2 is a top view of a display apparatus according to some embodiments of the present disclosure. In this regard, the present disclosure proposes a solution, as shown in FIG. 2, in some embodiments of the present disclosure, a row of dummy circuits 106 is arranged behind a last row of functional circuits 102 of a functional sub-region 103, and a dummy unit 107 is arranged behind the last shift unit 105 of the shift circuit 104. The structures and connection of the dummy circuit 106 and the dummy unit 107 are the same as those of the original functional circuit 102 and the shift unit 105, but the dummy circuit 106 has no specific functions. For example, the dummy circuit 106 is not connected to the light-emitting element and thus does not have a function of display images, or the dummy circuit 106 is not connected to the photosensitive element and thus does not have a fingerprint recognition function.

With such configuration, when a functional sub-region 103 is controlled to work individually, the last shift unit 105 in the shift circuit 104 can continue to trigger downward, so that the dummy unit 107 outputs a driving signal. At this time, the driving signal can be transmitted to the last row of functional circuits 102 of the functional sub-region 103, and can serve as the second driving signal of this row of the functional circuits 102 to cause the last row of the functional circuits 102 to normally perform the second operation.

However, by adopting the above configuration, every two adjacent functional sub-regions 103 can be separated by providing a row of dummy circuits 106 therebetween. Since the dummy circuits 106 has no image display functions or fingerprint recognition functions, so that the image displaying at the position of the dummy circuit 106 is discontinuous, or the fingerprint cannot be recognized at the position of the dummy circuit 106, thereby resulting in poor image display effect or fingerprint recognition effect. The dummy circuit 106 occupies the space for arranging the original functional circuits 102. When an area of the functional region 101 is fixed, the number of the rows where the functional circuits 102 are located in each functional sub-region 103 is reduced, which is not conducive to achieve high pixel density.

In view of the above, the present disclosure proposes a circuit structure. By adopting the circuit structure, it is not necessary to set a dummy circuit between two adjacent functional sub-regions, so that the last row of functional circuits in the functional sub-region can achieve its complete function when the sub-regions are controlled.

Figure 3:
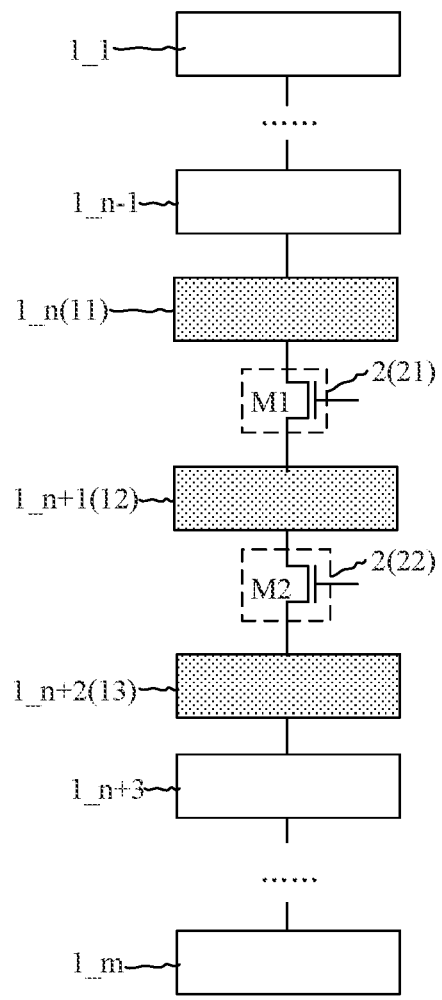
FIG. 3 is a schematic diagram of a circuit structure according to some embodiments of the present disclosure.

FIG. 3 is a schematic diagram of a circuit structure according to some embodiments of the present disclosure. As shown in FIG. 3, the circuit structure includes multiple shift units 1 that are cascaded. The shift unit 1 includes a first shift unit 11, a second shift unit 12 and a third shift unit 13.

Figure 4:
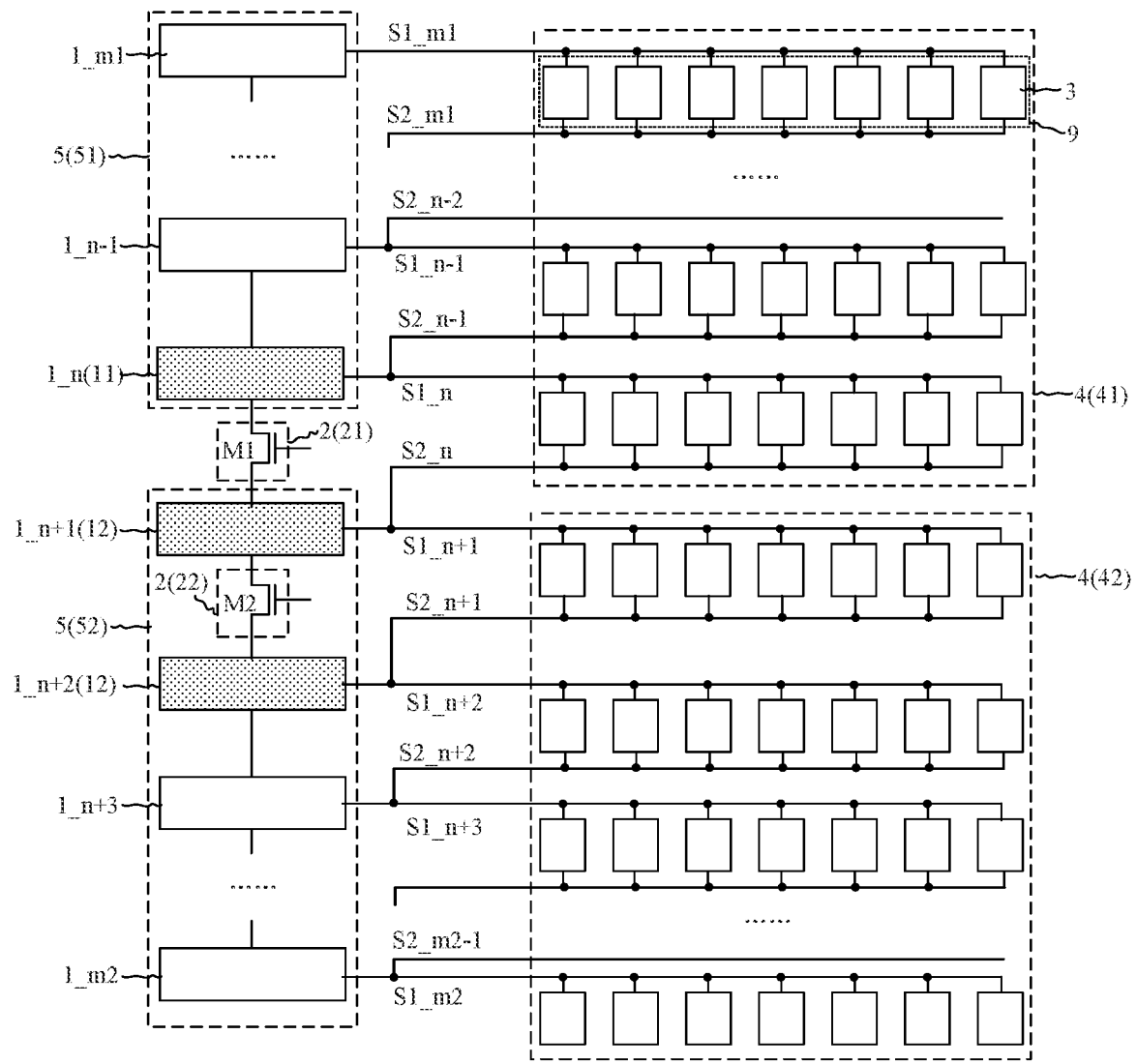
FIG. 4 is a schematic diagram showing a connection between a shift unit and a functional circuit according to some embodiments of the present disclosure.

FIG. 4 is a schematic diagram showing a connection between a shift unit and a functional circuit according to some embodiments of the present disclosure. In combination with the foregoing description, as shown in FIG. 4, among multiple cascaded shift units 1, an $i^{th}$ shift unit $1\_i$ is electrically connected to an $i^{th}$ row of functional circuits 3 through a first driving signal line $S1\_i$, and is also electrically connected to an $(i-1)^{th}$ row of functional circuits 3 through a second driving signal line $S2\_i-1$. A driving signal output by the $i^{th}$ shift unit $1\_i$ is used to control the $(i-1)^{th}$ row of functional circuits 3 to perform the second operation, and to control the $i^{th}$ row of functional circuits 3 to perform the first operation simultaneously.

As shown in FIG. 4, the $i^{th}$ shift unit 1 is denoted by a reference numeral $1\_i$, the first driving signal line S1 electrically connected to the $i^{th}$ row of functional circuits 3 is denoted by a reference numeral $S1\_i$, and the second driving signal line S2 electrically connected to the $i^{th}$ row of functional circuits 3 is denoted by a reference numeral $S2\_i$. In the present disclosure, the $i^{th}$ shift unit is defined as the shift unit 1, and the $i^{th}$ row of functional circuits is defined as the functional circuit 3 correspondingly.

The circuit structure can include a control circuit 2. The control circuit 2 includes a first control unit 21 and a second control unit 22. The first control unit 21 is electrically connected between the first shift unit 11 and the second shift unit 12. The first control unit 21 is configured to control a shift control signal output by the first shift unit 11 to be transmitted to the second shift unit 12 when the first control unit 21 is turned on. The second control unit 22 is electrically connected between the second shift unit 12 and the third shift unit 13. The second control unit 22 is configured to control the shift control signal output by the second shift unit 12 to be transmitted to the third shift unit when the second control unit 22 is turned on.

At a first time point, one of the first control unit 21 and the second control unit 22 is turned on, and another one of the first control unit 21 and the second control unit 22 is turned off.

In the process of sequentially outputting the driving signal by the shift units 1, when a previous shift unit 1 outputs a driving signal, the previous shift unit 1 will output a shift control signal synchronously. The shift control signal is transmitted to a latter shift unit 1, and then the next shift unit 1 is triggered to continuously output the driving signal, thereby achieving the sequential shift of multiple shift units 1. In some embodiments, the driving signal output by the shift unit 1 can be reused as a shift control signal.

Referring to FIG. 4, for example, the first shift unit 11 is the $n^{th}$ shift unit $1\_n$, the second shift unit 12 is the $(n+1)^{th}$ shift unit $1\_n+1$, and the third shift unit 13 is the $(n+2)^{th}$ shift unit $1\_n+2$. In some embodiments of the present disclosure, when the functional sub-region where the $m1^{th}$ to $n^{th}$ rows of functional circuits 3 are located is individually controlled, the first control unit 21 is turned on and the second control unit 22 is turned off. In some embodiments, the $m1^{th}$ shift unit $1\_m1$ to the $n^{th}$ shift unit $1\_n$ (the first shift unit 11) output driving signals in sequence. Since the first control unit 21 is turned on, the shift control signal output by the $n^{th}$ shift unit $1\_n$ (the first shift unit 11) can be transmitted to the $(n+1)^{th}$ shift unit $1\_n+1$ (the second shift unit 12) to trigger the $(n+1)^{th}$ shift unit $1\_n+1$ (the second shift unit 12) to continuously output a driving signal which can be used as the second driving signal of the $n^{th}$ row of functional circuits 3 to cause the $n^{th}$ row of functional circuits 3 to perform the second operation. Simultaneously, since the second control unit 22 is turned off, the shift control signal output by the $(n+1)^{th}$ shift unit $1\_n+1$ (second shift unit 12) is no longer transmitted to the $(n+2)^{th}$ shift unit $1\_n+2$ (third shift unit 13), and at this time, the shift unit 1 does not continue to shift downward.

In the present disclosure, the functional circuit 3 in the last row of the functional sub-regions can achieve its complete function while achieving the control of the sub-region. When the functional circuit 3 is a photosensitive circuit, the photosensitive circuit in the last row of the functional sub-region can be reset normally, so that the fingerprint recognition of the next frame is not affected, thereby improving the fingerprint recognition accuracy. When the functional circuit 3 is a pixel circuit, the pixel circuit in the last row of the functional sub-region can normally write data signals, so that the light-emitting element electrically connected to the pixel circuit in the last row can emit light normally, thereby improving the picture continuity between two adjacent functional sub-regions, and optimizing the display effect.

In the embodiments of the present disclosure, there is no need to provide the dummy circuits between two adjacent functional sub-regions, which not only avoids dummy circuits to occupy the space of the original functional circuit 3 so as to improve the pixel density, but also avoids the picture continuity or poor fingerprint recognition caused by the dummy circuits.

Figure 5:
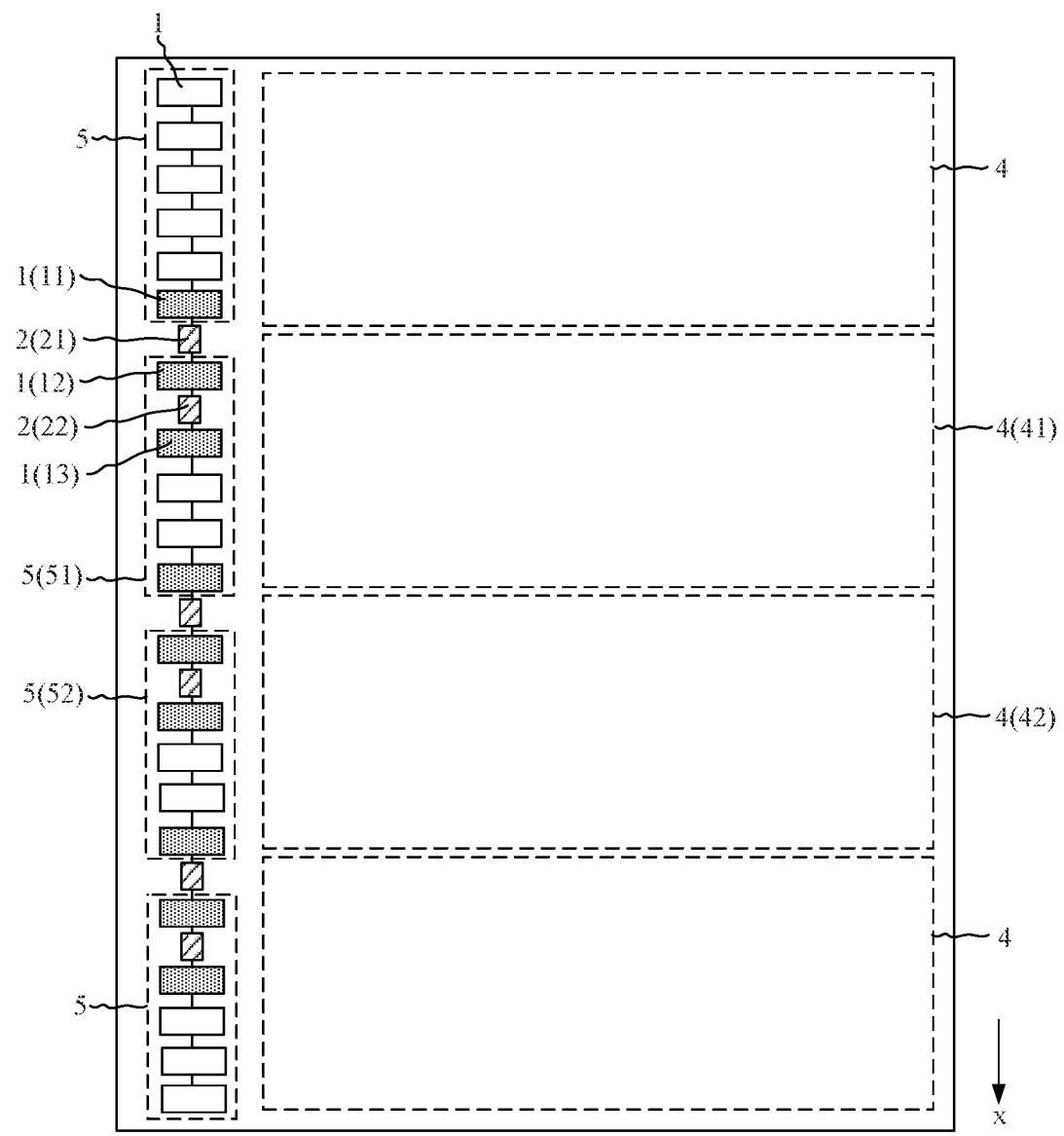
FIG. 5 is a schematic diagram of functional sub-regions according to some embodiments of the present disclosure.

FIG. 5 is a schematic diagram of functional sub-regions according to some embodiments of the present disclosure. In some embodiments of the present disclosure, as shown in FIG. 5, an entire functional region can be divided into at least two functional sub-regions 4 arranged along a first direction x. Each functional sub-region 4 corresponds to one shift circuit 5 which includes multiple cascaded shift units 1. For two adjacent shift circuits 5, the last shift unit in the former shift circuit 5 is the first shift unit 11, a first shift unit in the latter shift unit 1 is the second shift unit 12, and a second shift unit in the latter shift unit 1 is the third shift unit 13. When a certain functional sub-region 4 is individually controlled, it is only necessary to control the shift circuit 5 and the control circuit 2 corresponding to the functional sub-region 4 to work normally.

Exemplarily, referring to FIG. 4 and FIG. 5, the functional region includes a first functional sub-region 41 and a second functional sub-region 42. The m1$^{th}$ row to the n$^{th}$ row of functional circuits 3 are provided in the first functional sub-region 41, where m≥1. The (n+1)$^{th}$ row to the m2$^{th}$ row of functional circuits 3 are provided in the second functional sub-region 42.

The circuit structure can include a first shift circuit 51 and a second shift circuit 52. The first shift circuit 51 is configured to drive the first functional sub-region 41. The first shift circuit 51 includes an m1$^{th}$ shift unit 1_$m$1 to an n$^{th}$ shift unit 1_$n$ that are cascaded. The second shift circuit 52 is configured to drive the second functional sub-region 42. The second shift circuit 52 includes an (n+1)$^{th}$ shift unit 1_$n$+1 to an m2$^{th}$ shift unit 1_$m$2 that are cascaded.

The n$^{th}$ shift unit 1_$n$ is the first shift unit 11, the (n+1)$^{th}$ shift unit 1_$n$+1 is the second shift unit 12, and the (n+2)$^{th}$ shift unit 1_$n$+2 is the third shift unit 13.

When the first functional sub-region 41 is individually controlled, the first shift circuit 51 works, the first control unit 21 connected between the n$^{th}$ shift unit 1_$n$ and the (n+1)$^{th}$ shift unit 1_$n$+1 is turned on, and the second control unit 22 connected between the (n+1)$^{th}$ shift unit 1_$n$+1 and the (n+2)$^{th}$ shift unit 1_$n$+2 is turned off. In such a process, the m1$^{th}$ shift unit 1_$m$1 to the n$^{th}$ shift unit 1_$n$ sequentially output driving signals. Since the first control unit 21 is turned on, the shift control signal output by the n$^{th}$ shift unit 1_$n$ can trigger the (n+1)$^{th}$ shift unit 1_$n$+1 to continuously output driving signals, and since the second control unit 22 is turned off, the shift control signal output by the (n+1)$^{th}$ shift unit 1_$n$+1 cannot trigger the (n+2)$^{th}$ shift unit 1_$n$+2, therefore the shift unit 1 does not continue to shift downward.

When the second functional sub-region 42 is individually controlled, the second shift circuit 52 works, the first control unit 21 connected between the n$^{th}$ shift unit 1_$n$ and the (n+1)$^{th}$ shift unit 1_$n$+1 is turned off, and the second control unit 22 connected between the (n+1)$^{th}$ shift unit 1_$n$+1 and the (n+2)$^{th}$ shift unit 1_$n$+2 is turned on. In such a process, the (n+1)$^{th}$ shift unit 1_$n$+1 outputs the driving signal. Since the second control unit 22 is turned on, the shift control signal output by the (n+1)$^{th}$ shift unit 1_$n$+1 can trigger the (n+2)$^{th}$ shift unit 1_$n$+2 to continuously output driving signals, thereby achieving continuous downward shift.

In some embodiments, referring to FIG. 3 and FIG. 4 again, the first control unit 21 includes a first transistor M1. The first transistor M1 is electrically connected between the first shift unit 11 and the second shift unit 12. The second control unit 22 includes a second transistor M2. The second transistor M2 is electrically connected between the second shift unit 12 and the third shift unit 13. At the first time point, one of the first transistor M1 and the second transistor M2 is turned on, and the other of the first transistor M1 and the second transistor M2 is turned off.

A first electrode of the first transistor M1 is electrically connected to a shift output terminal of the first shift unit 11, and a second electrode of the first transistor M1 is electrically connected to a shift control terminal of the second shift unit 12. By controlling the turn-on state of the first transistor M1, a signal transmission path between the first shift unit 11 and the second shift unit 12 can be controlled. A first electrode of the second transistor M2 is electrically connected to the shift output terminal of the second shift unit 12, and a second electrode of the second transistor M2 is electrically connected to the shift control terminal of the third shift unit 13. By controlling the turn-on state of the second transistor M2, a signal transmission path between the second shift unit 12 and the third shift unit 13 can be controlled.

When the first control unit 21 and the second control unit 22 adopt transistor structures, in some embodiments, the first transistor M1 and the second transistor M2 have a same transistor type. For example, the first transistor M1 and the second transistor M2 are both N-type transistors shown in FIG. 3, or are both P-type transistors. At the first time point, one of the first transistor M1 and the second transistor M2 receives a turn-on level, and the other of the first transistor M1 and the second transistor M2 receives a turn-off level, so that at the first time point, only one of the first transistor M1 and the second transistor M2 is turned on.

The first control unit 21 and the second control unit 22 adopt a same type of transistor structure. In the process of the circuit structure, the manufacturing processes of the two transistors, such as doping processes, are the same, thereby achieving a simple process.

Figure 6:
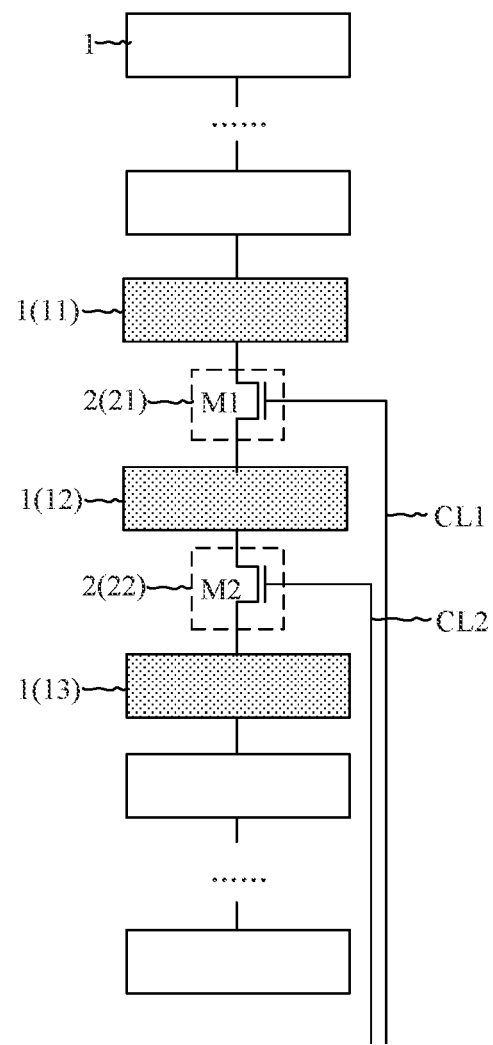
FIG. 6 is a schematic diagram of a circuit structure according to some embodiments of the present disclosure.

FIG. 6 is a schematic diagram of a circuit structure according to some embodiments of the present disclosure. As shown in FIG. 6, a gate electrode of the first transistor M1 is electrically connected to the first control signal line CL1, and a gate electrode of the second transistor M2 is electrically connected to the second control signal line CL2. With such configuration, at the first time point, the first control signal line CL1 and the second control signal line CL2 have opposite level states, i.e., one of the first transistor M1 and the second transistor M2 is turned on and another one of the first transistor M1 and the second transistor M2 is turned off.

The first transistor M1 and the second transistor M2 are individually controlled through two control signal lines, so that the control of these two transistors are more flexible. For example, at a time point other than the first time point, the first control signal line CL1 and the second control signal line CL2 can provide signals with a same level state, so as to control the first transistor M1 and the second transistor M2 to be turned on synchronously or turned off synchronously. Exemplarily, referring to FIG. 3, based on the above configuration, in some embodiments of the present disclosure, the first functional sub-region 41 and the second functional sub-region 42 are both controlled to work: the first control signal line CL1 and the second control signal line CL2 simultaneously provide a turn-on level to control the first transistor M1 and the second transistor M2 to be turned on synchronously. At this time, the first shift unit 11 in the first shift circuit 51 triggers the second shift unit 12 in the second shift circuit 52 to continuously output the driving signal, and the second shift unit 12 can further trigger the third shift unit 13, and thus the shift units 1 after the second shift unit 12 output the driving signal in sequence.

Figure 7:
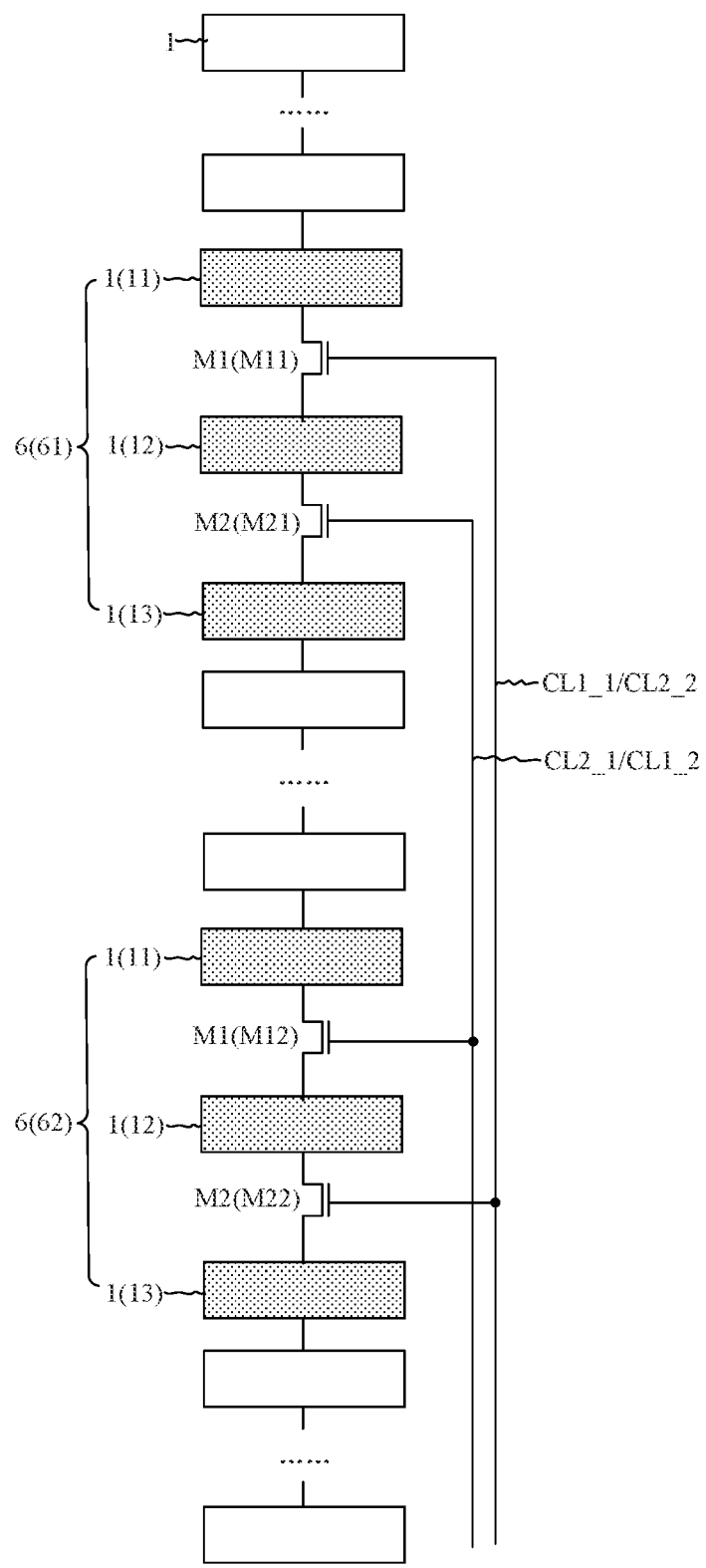
FIG. 7 is a schematic diagram of a circuit structure according to some embodiments of the present disclosure.

FIG. 7 is a schematic diagram of a circuit structure according to some embodiments of the present disclosure. As shown in FIG. 7, the circuit structure includes at least two shift groups 6. Each shift group 6 includes a first shift unit 11, a second shift unit 12 and a third shift unit 13.

The at least two shift groups 6 include a first shift group 61 and a second shift group 62. A first transistor M1 connected between the first shift unit 11 and the second shift unit 12 in the first shift group 61 is a first A transistor M11. A second transistor M2 connected between the second shift unit 12 and the third shift unit 13 in the first shift group 61 is a second A transistor M21. A first transistor M1 connected between the first shift unit 11 and the second shift unit 12 in the second shift group 62 is a first B transistor M12. A second transistor M2 connected between the second shift unit 12 and the third shift unit 13 in the second shift group 62 is a second B transistor M22.

The first control signal line CL1_1 electrically connected to the first A transistor M11 is reused as the second control signal line CL2_2 electrically connected to the second B transistor M22. The second control signal line CL2_1 electrically connected to the second A transistor M21 is reused as the first control signal line CL_2 electrically connected to the first B transistor M12.

Referring to FIG. 5, for example, the first shift unit 11 in the first shift group 61 is located in the first shift circuit 51, and the first shift unit 11 in the second shift group 62 is located in the second shift circuit 51. Assuming that when the first functional sub-region 41 is individually controlled, at the first time point, the first control signal line CL1 electrically connected to the first A transistor M11 provides a turn-on level, and the second control signal line CL2 electrically connected to the second A transistor M21 provides a turn-off level, so that the first A transistor M11 is controlled to be turned on, and the second A transistor M21 is controlled to be turned off. At this time, although the second B transistor M22 will receive the turn-on level and the first B transistor M12 will receive the turn-off level, since the second shift circuit 52 corresponding to the second functional sub-region 42 does not work, there is no transmission of the shift control signal, thereby not affecting the second functional sub-region 42. When the first functional sub-region 41 and the second functional sub-region 42 both do not work, these two control signal lines can provide a cut-off level. Such configuration can simplify layout, thereby reducing the space occupied by the control signal lines.

In some embodiments, when the circuit structure includes 2× shift groups 6, odd-numbered shift groups 6 of the 2× shift groups can be the first shift group 61, and even-numbered shift groups 6 of the 2× shift groups can be the second shift group 62. The first control signal line CL1 and the second control signal line CL2 corresponding to the first shift group 61 and the second shift group 62 that are adjacent to each other are reused as the above. At this time, the entire circuit structure can be provided only 2× control signal lines, so that there is a relatively small number of the control signal lines, thereby simplifying the layout.

Figure 8:
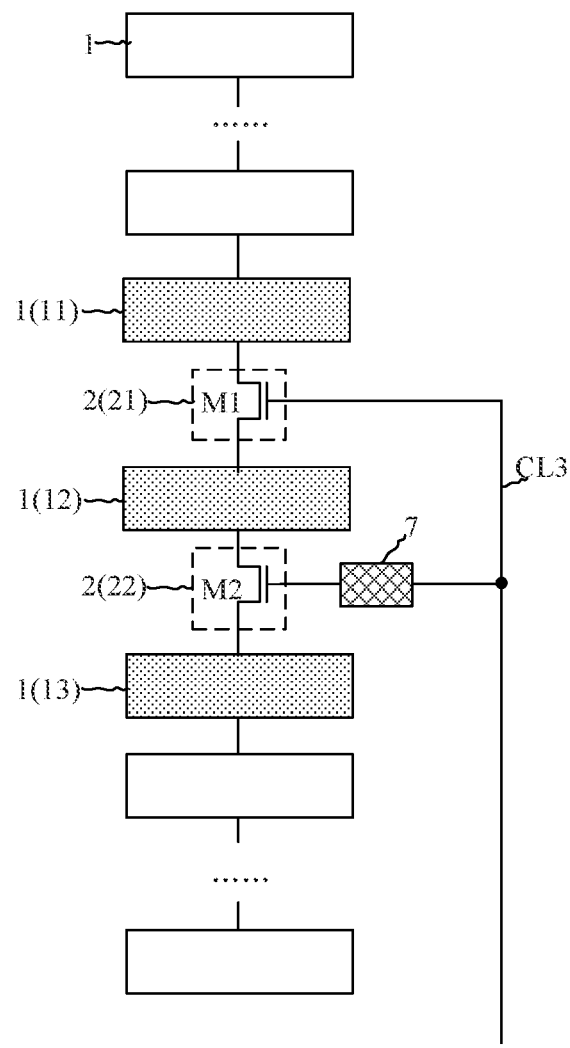
FIG. 8 is a schematic diagram of a circuit structure according to some embodiments of the present disclosure.

When the first transistor M1 and the second transistor M2 are of the same transistor type, the first transistor M1 and the second transistor M2 can also be electrically connected to a same control signal line. FIG. 8 is a schematic diagram of a circuit structure according to some embodiments of the present disclosure. As shown in FIG. 8, a gate electrode of the first transistor M1 is electrically connected to the third control signal line CL3, and a gate electrode of the second transistor M2 is electrically connected to the third control signal line CL3 through an inverter 7.

At the first time point, when it is necessary to control the first control unit 21 to be turned on and the second control unit 22 to be turned off, the third control signal line CL3 provides a turn-on level to control the first transistor M1 to be turned on. Synchronously, the turn-on level provided by the third control signal line CL3 is converted to the turn-off level through the inverter 7 and transmitted to the second transistor M2, so as to control the second transistor M2 to be turned off. With such configuration, only one third control signal line CL3 is required to drive the first transistor M1 and the second transistor M2, and based on the configuration of the inverter 7, the first transistor M1 and the second transistor M2 can receive signals with opposite level states at the same time point, thereby ensuring opposite working states of the first transistor M1 and the second transistor M2 at the first time point.

Figure 9:
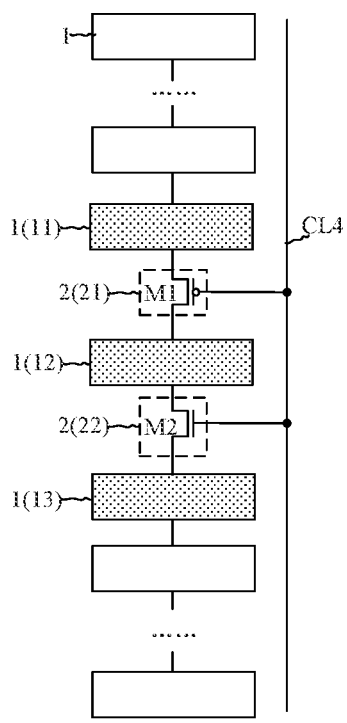
FIG. 9 is a schematic diagram of a circuit structure according to some embodiments of the present disclosure.

FIG. 9 is a schematic diagram of a circuit structure according to some embodiments of the present disclosure. In some embodiments, as shown in FIG. 9, the first transistor M1 and the second transistor M2 are of different transistor types, for example, the first transistor M1 is an N-type transistor and the second transistor M2 is a P-type transistor; or the first transistor M1 is a P-type transistor and the second transistor M2 is an N-type transistor. The gate electrode of the first transistor M1 and the gate electrode of the second transistor M2 each are electrically connected to the fourth control signal line CL4.

When the first control unit 21 is turned on and the second control unit 22 is turned off, the fourth control signal line CL4 provides a first level to turn on the first transistor M1 and turn off the second transistor M2. When the first control unit 21 is turned off and the second control unit 22 is turned on, the fourth control signal line CL4 provides a second level to turn off the first transistor M1 and turn on the second transistor M2. With such configuration, only one fourth control signal line CL4 controls one of the first transistor M1 and the second transistor M2 to be turned on at the first time point and another one of the first transistor M1 and the second transistor M2 to be turned off. The number of driving signal lines connected to the control circuit 2 is small, and accordingly, the number of signal sources for providing signals to the driving signal lines is also reduced accordingly.

If two control signals control the first control unit 21 and the second control unit 22, respectively, the timing sequences of the two control signals cooperate with each other so that one of the first control unit 21 and the second control unit 22 can be controlled to be turned on, and another one of the first control unit 21 and the second control unit 22 can be controlled to be turned off synchronously. However, in the present disclosure, only one fourth control signal controls the first control unit 21 and the second control unit 22 synchronously, and the turn-on time point of the first control unit 21 and the turn-on time point of the second control unit 22 can be staggered from each other without considering the cooperation of the timing sequences.

Figure 10:
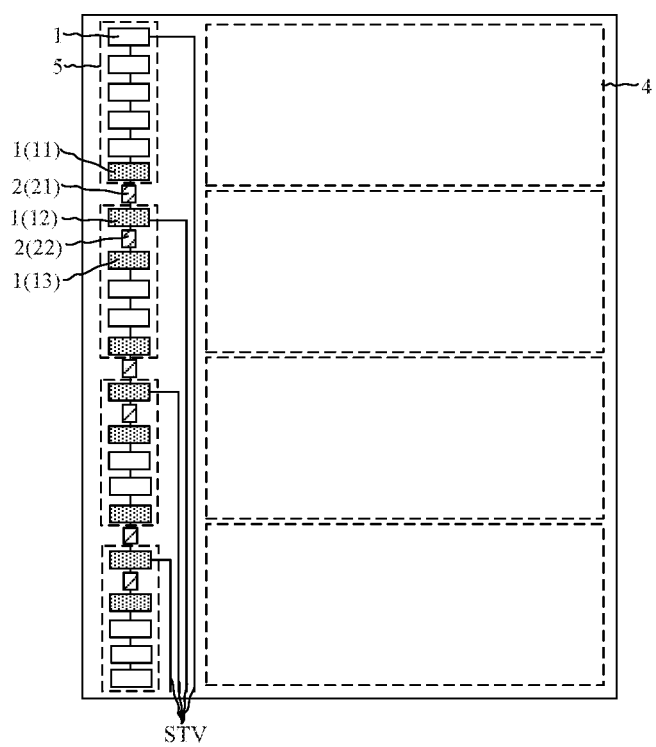
FIG. 10 is a schematic diagram of a circuit structure according to some embodiments of the present disclosure.

FIG. 10 is a schematic diagram of a circuit structure according to some embodiments of the present disclosure. In some embodiments of the present disclosure, as shown in FIG. 10, when the functional region is divided into multiple functional regions 4, the shift circuits 5 corresponding to the respective functional region 4 can be electrically connected to one frame start signal line STV. When the $x^{th}$ functional sub-region 4 is individually controlled, the frame start signal line STV electrically connected to the $x^{th}$ shift circuit 5 provides the $x^{th}$ shift circuit 5 with a frame start signal to control the shift circuit 5 to work.

Figure 11:
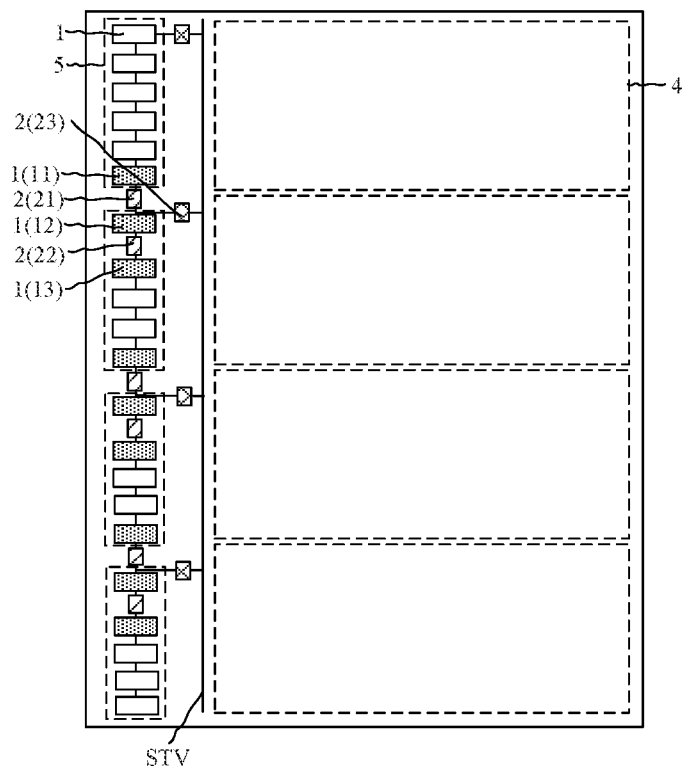
FIG. 11 is a schematic diagram of a circuit structure according to some embodiments of the present disclosure.

FIG. 11 is a schematic diagram of a circuit structure according to some embodiments of the present disclosure. As shown in FIG. 11, multiple shift circuits 5 can be electrically connected to the frame start signal line STV through one third control unit 23 respectively. When the $x^{th}$ functional sub-region 4 is individually controlled, the third control unit 23 electrically connected to the $x^{th}$ shift circuit 5 is turned on to transmit the frame start signal provided by the frame start signal line STV into the shift circuit 5, and then control the shift circuit 5 to work.

Figure 12:
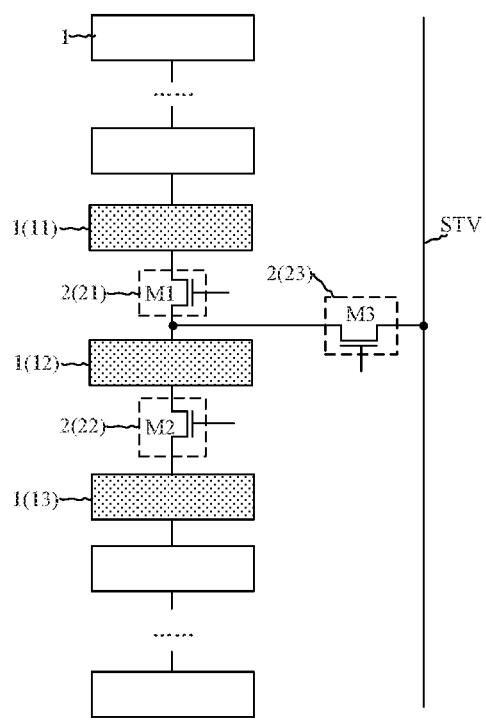
FIG. 12 is a schematic diagram of a circuit structure according to some embodiments of the present disclosure.

FIG. 12 is a schematic diagram of a circuit structure according to some embodiments of the present disclosure. As shown in FIG. 12, the control circuit 2 further includes a third control unit 23. At least part of third control unit 23 is electrically connected to the second shift unit 12. The third control unit 23 is configured to be turned on to transmit the frame start signal to the second shift unit 12 when the second control unit 22 is turned on.

With reference to the above contents, the second shift unit 12 is the first shift unit in each shift circuit 5. By providing the third control unit 23 electrically connected to the second shift unit 12, when the functional sub-region 4 is controlled to be turned on, the third control unit 23 is turned on to trigger the second shift unit 12 in the shift circuit 5, so that the second shift unit 12 outputs the driving signal, and synchronously, the second control unit 22 controls the second shift unit 12 to trigger the third shift unit 13, thereby achieving a continuous downward shift. That is, the third control unit 23 can function as a gating switch, by controlling multiple third control units 23 to be turned on at different time points, so as to achieve the time-division transmission of the frame start signal provided by the frame start signal line STV to different second shift units 12. With such configuration, the second shift units 12 in the shift circuits 5 corresponding to all functional sub-regions 4 are triggered by only same one frame start signal line STV. Compared to the manner in which each second shift unit 12 is electrically connected to one frame start signal lines STV, the number of frame start signal lines STV in the display panel is reduced, especially for a display apparatus with a large number of functional sub-regions 4, the number of frame start signal lines STV can be greatly reduced.

In order to improve the operation reliability of the circuit, the second control unit 22 and the third control unit 23 can be turned on synchronously. That is, while the third control unit 23 controls the frame start signal to trigger the second shift unit 12, the second control unit 22 controls to the transmission path of the shift control signal between the second shift unit 12 and the third shift unit 13 to be turned on, so that the shift control signal after the second shift unit 12 is triggered can be transmitted to the third shift unit 13 more quickly, thereby achieving the downward shift in time.

Referring to FIG. 12 again, the third control unit 23 includes a third transistor M3 that is electrically connected between the frame start signal line STV and the second shift unit 12. In some embodiments, a first electrode of the third transistor M3 is electrically connected to the frame start signal line STV, and a second electrode of the third transistor M3 is electrically connected to the shift control terminal of the second shift unit 12. By controlling the turn-on state of the third transistor M3, the signal transmission path between the frame start signal line STV and the second shift unit 12 is controlled.

Figure 13:
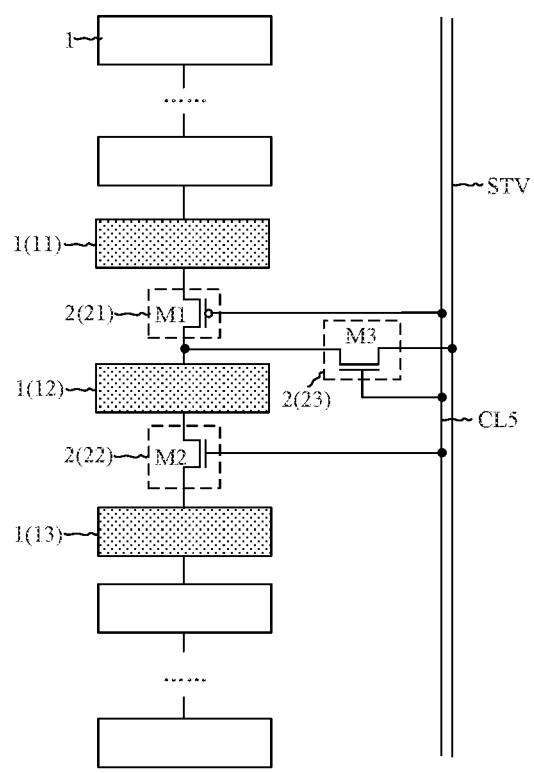
FIG. 13 is a schematic diagram of a circuit structure according to some embodiments of the present disclosure.

FIG. 13 is a schematic diagram of a circuit structure according to some embodiments of the present disclosure. As shown in FIG. 13, when the third control unit 23 includes a third transistor M3, the second control unit 22 includes a second transistor M2 that is electrically connected between the second shift unit 12 and the third shift unit 13. The second transistor M2 has a same transistor type as the third transistor M3. A gate electrode of the second transistor M2 and a gate electrode of the third transistor M3 are respectively electrically connected to the fifth control signal line CL5 to control the second transistor M2 and the third transistor M3 to be turned on or turned off by the fifth control signal synchronously. It can be understood that, if two different control signals individually control the second transistor M2 and the third transistor M3, the timing sequences of the two control signals also cooperate with each other to control the second transistor M2 and the third transistor M3 synchronously. In contrast, in the present disclosure, only one fifth control signal is provided to control the second transistor M2 and the third transistor M3 without the cooperation of the timing sequences, therefore, it is easier to accurately achieve synchronous turn-on or turn-off of the second transistor M2 and the third transistor M3.

In order to reduce the number of the control signal lines electrically connected to the control circuit 2, referring to FIG. 13 again, the first transistor M1 and the second transistor M2 can have opposite transistor types. In this case, the gate electrode of the first transistor M1 can be electrically connected to the fifth control signal line CL5.

Figure 14:
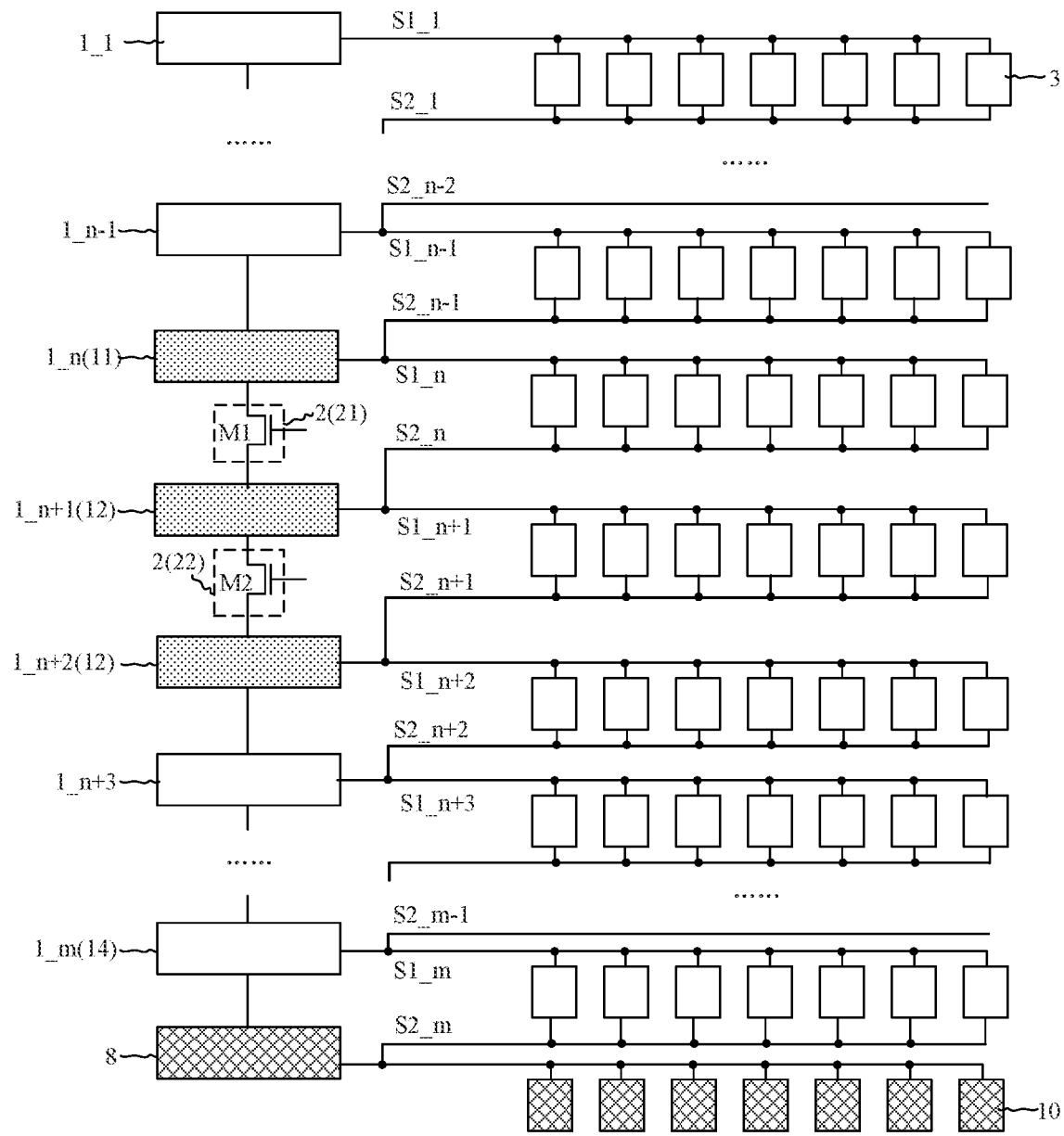
FIG. 14 is a schematic diagram of a dummy unit according to some embodiments of the present disclosure.

FIG. 14 is a schematic diagram of a dummy unit according to some embodiments of the present disclosure. In some embodiments, as shown in FIG. 14, the circuit structure includes a dummy unit 8 cascaded with a fourth shift unit 14. The fourth shift unit 14 is the last shift unit 1 in the multiple cascaded shift units 1. That is, the fourth shift unit 14 corresponds to the last row of functional circuits 3 in the entire functional region. The dummy unit 8 is electrically connected to the last row of functional circuits 3 in the entire functional region through the second driving signal line S2. The dummy unit 8 is configured to output the driving signal when the fourth shift unit 14 transmits the shift control signal to it, so that the last row of functional circuits 3 in the entire functional region can also perform the second operation under the second driving signal, thereby achieving its complete function.

Referring to FIG. 14 again, a row of dummy circuits 10 can also be added after the last row of functional circuits 3 in the entire functional region. The dummy circuit 10 and the dummy unit 8 have the same structure and connection manner as the original functional circuit and the shift unit 1, except that the dummy circuit 10 does not undertake specific functions. For example, the dummy circuit 10 is not connected to the light-emitting element and thus does not undertake the screen display function or the fingerprint recognition function. Even if the dummy circuit 10 is provided in the present disclosure, since the dummy circuit 10 is only located on the lower side of the functional region, it will not affect the convergence of the screen of the functional region or the fingerprint recognition.

In some embodiments, referring to FIG. 4 again, the circuit structure includes multiple circuit groups 9. The circuit group 9 includes multiple functional circuits 3. The functional circuit 3 is electrically connected to the first driving signal line S1 and the second driving signal line S2. The functional circuit 3 is configured to perform a first operation under the first driving signal and perform a second operation under the second driving signal. It can be understood that one circuit group 9 can be regarded as a row of functional circuits 3, or a column of functional circuits 3.

The $i^{th}$ shift unit $1\_i$ is electrically connected to a first driving signal line $S1\_i$ electrically connected to an $i^{th}$ circuit group 9, and is also electrically connected to a second driving signal line $S2\_i$ electrically connected to an $(i-1)^{th}$ circuit group 9, where i is a positive integer greater than or equal to 2.

With reference to the above analysis, based on the mutual cooperation between the shift unit 1 and the control circuit 2, while achieving the sub-region control, the functional circuit 3 in the last circuit group 9 of the functional sub-region 4 can normally receive the second driving signal, so that it can normally perform a second operation to have a complete function.

Figure 15:
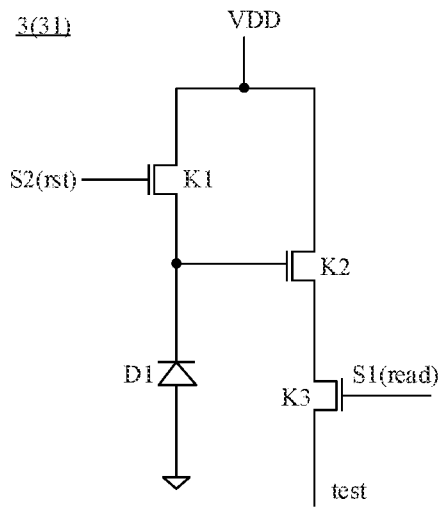
FIG. 15 is a schematic diagram of a functional circuit according to some embodiments of the present disclosure.

FIG. 15 is a schematic diagram of a functional circuit according to some embodiments of the present disclosure. In some embodiments, as shown in FIG. 15, the functional region can include a recognizing functional region for achieving a fingerprint recognition function. In this case, a functional circuit 3 includes a photosensitive circuit 31, a first driving signal line S1 is a read control signal line read, and a second driving signal line S2 is a reset control signal line rst. The photosensitive circuit 31 is configured to perform a read operation (a first operation) under a read control signal and a reset operation (a second operation) under a reset control signal.

The photosensitive circuit 31 includes a reset transistor K1, a driving transistor K2 and a read transistor K3. During the operation of the photosensitive circuit 31, the photosensitive element D1 generates a leakage current according to the light reflected by the finger to control the driving transistor K2 to be turned on. Then, the read transistor K3 reads a detection voltage under the read control signal and transmits it to the detection signal line test. The detection voltage can reflect the conduction degree of the driving transistor K2, and then reflect the magnitude of the leakage current generated by the photosensitive element D1. Therefore, the valley and ridge of the fingerprint can be judged according to the leakage current. Under the reset control signal, the reset transistor K1 uses a fixed potential signal provided by the fixing potential signal line VDD to reset the gate electrode of the driving transistor K2, thereby the gate potential of the driving transistor K2 in the next frame can be a uniform initial potential.

Based on the above analysis, the $i^{th}$ shift unit $1\_i$ is electrically connected to the read transistor K3 of the photosensitive circuit 31 in the $i^{th}$ circuit group 9 through the read control signal line read, and is also electrically connected to the reset transistor K1 of the photosensitive circuit 31 in the $(i-1)^{th}$ circuit group 9 through the reset signal line rst. The driving signal output by the $i^{th}$ shift unit $1\_i$ is not only used as the read control signal of the photosensitive circuit 31 in the $i^{th}$ circuit group 9 to make it perform a read operation, but also used as the reset control signal of the photo-sensitive circuit 31 in the $(i-1)^{th}$ circuit group 9 to make it perform a reset operation.

When a traditional setting manner is adopted, the photosensitive circuit 31 in the last circuit group 9 of the functional sub-region 4 cannot receive the reset control signal, so that the reset operation of the driving transistor K2 cannot be performed, thereby resulting in the non-uniform initial voltage of the gate electrode of the driving transistor K2 of the photosensitive circuit 31 at different positions of the next frame, and thus resulting in inaccurate recognition. In contrast, in the present disclosure, the photosensitive circuit 31 in the last circuit group 9 of the functional sub-region 4 can normally receive the reset control signal, so that the reset operation can be performed under the reset control signal, so that the uniformity of the initial voltage of the gate electrode of the driving transistor K2 of the photosensitive circuit 31 at different positions is improved, and the detection voltage detected in the next frame can accurately reflect the magnitude of the leakage current generated by the photosensitive element D1, thereby effectively improving the fingerprint recognition accuracy.

Figure 16:
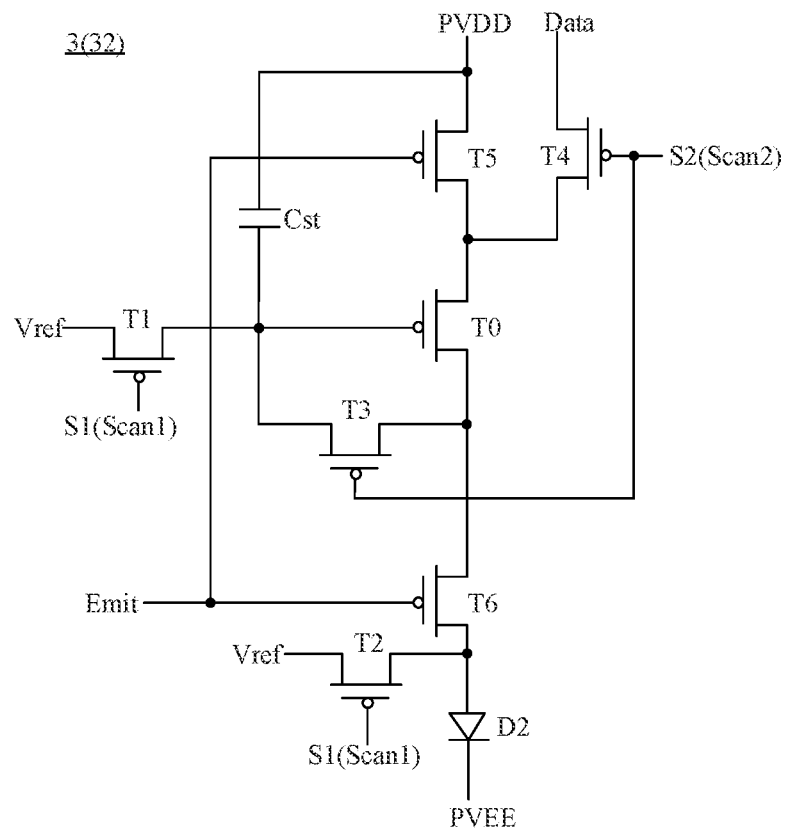
FIG. 16 is a schematic diagram of the functional circuit according to some embodiments of the present disclosure.

FIG. 16 is a schematic diagram of the functional circuit according to some embodiments of the present disclosure. In some embodiments, as shown in FIG. 16, the functional region in the present disclosure can include a display function region for achieving a screen display function. In this case, the functional circuit 3 includes a pixel circuit 32. The first driving signal line S1 is the first scanning signal line Scan1. The second driving signal line S2 is the second scanning signal line Scan2. The pixel circuit 32 is configured to perform the reset operation (first operation) under the first scanning signal and perform the data writing operation (the second operation) under the second scanning signal.

The pixel circuit 32 includes a driving transistor T0, a gate reset transistor T1, an anode reset transistor T2, a data writing transistor T4, a threshold compensation transistor T3, a first light-emitting control transistor T5, a second light-emitting control transistor T6, and a storage capacitor Cst.

The gate reset transistor T1 writes the reset signal provided by the reset signal line Vref to the gate electrode of the driving transistor T0 under the first scanning signal, so as to reset the gate electrode of the driving transistor T0. The anode reset transistor T2 writes the reset signal provided by the reset signal line Vref to the anode of the light-emitting element D2, so as to reset the anode of the light-emitting element D2, i.e., performing a reset operation.

Then, the data writing transistor T4 and the threshold compensation transistor T3 write the data signal provided by the data line Data to the gate electrode of the driving transistor T0 under the second scanning signal, and perform threshold compensation on the driving transistor T0, i.e., performing a data writing operation.

Then, under the light-emitting control signal provided by the light-emitting control signal line Emit, the first light-emitting control transistor T5 and the second light-emitting control transistor T6 control the signal transmission path between the power supply signal line PVDD and the anode of the light-emitting element D2 to be turned on, and transmit the driving current converted by the driving transistor T0 to the light-emitting element D2 to drive the light-emitting element D2 to emit light.

With reference to the above description, the $i^{th}$ shift unit $1\_i$ is electrically connected to a gate reset transistor T1 and an anode reset transistor T2 of the pixel circuit 32 in the $i^{th}$ circuit group 9 through the first scanning signal line Scan1, and is also electrically connected to a data writing transistor T1 and a threshold compensation transistor T3 of the pixel circuit 32 in the $(i-1)^{th}$ circuit group 9 through the second scanning signal line Scan2. The driving signal output by the $i^{th}$ shift unit 1_$i$ is not only used as a first scanning signal of the pixel circuit 32 in the $i^{th}$ circuit group 9 to perform a reset operation, but also used as a second scanning signal of the pixel circuit 32 in the $(i-1)^{th}$ circuit group 9 to perform a data writing operation.

When using the traditional configuration, the pixel circuit 32 in the last circuit group 9 of the functional sub-region 4 cannot receive the second scanning signal, so that the data writing transistor T4 and the threshold compensation transistor T3 cannot perform the data writing operation, which will lead to this part of the pixel circuit 32 cannot be charged to drive the light-emitting element D2 connected to it to emit light, resulting in a discontinuous screen. In some embodiments of the present disclosure, the photosensitive circuit 31 in the last circuit group 9 of the functional sub-region 4 can normally receive the second scanning signal, so that the data writing operation can be performed under the second scanning signal to control the light-emitting element D2 to emit light, thereby effectively improving the display effect.

In order to simplify the layout and save the space occupied by the driving signal lines, the first driving signal line S1_$i$ electrically connected to the $i^{th}$ circuit group 9 can also be reused with the second driving signal line S2_$i$–1 electrically connected to the $(i-1)^{th}$ circuit group 9.

Figure 17:
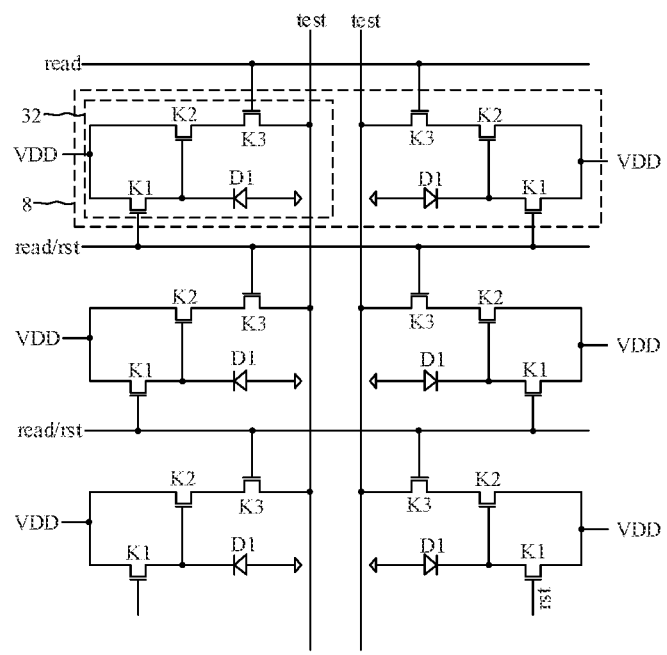
FIG. 17 is a schematic diagram showing a connection structure between a circuit group and driving signal line according to some embodiments of the present disclosure.
Figure 18:
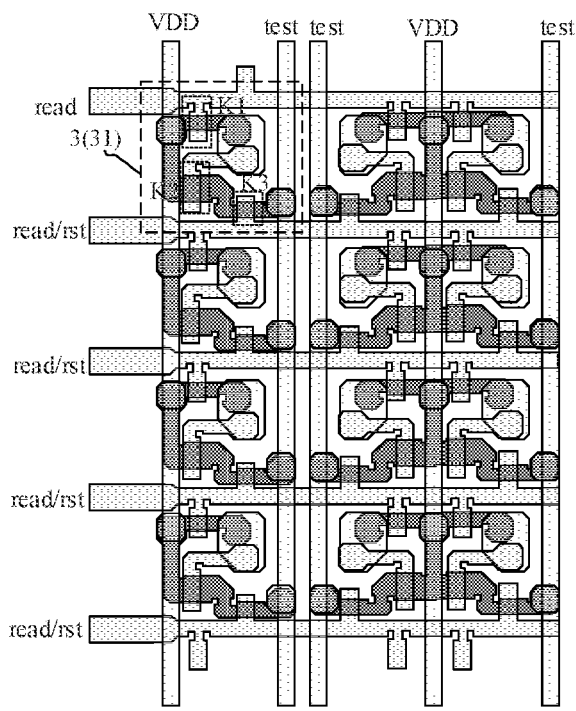
FIG. 18 is a schematic diagram showing a connection layout between a circuit group and driving signal line according to some embodiments of the present disclosure.

FIG. 17 is a schematic diagram showing a connection structure between a circuit group 9 and driving signal line according to some embodiments of the present disclosure, and FIG. 18 is a schematic diagram showing a connection layout between a circuit group 9 and driving signal line according to some embodiments of the present disclosure. Taking the functional circuit 3 as the photosensitive circuit 31 as an example, as shown in FIG. 17 and FIG. 18, the read control signal line read electrically connected to the $i^{th}$ circuit group 9 can be reused as the reset control signal line rst electrically connected to the $(i-1)^{th}$ circuit group 9.

The present disclosure also provides a method for driving a circuit structure mentioned above.

Referring to FIG. 3 and FIG. 4, a method for driving a circuit structure includes: controlling the shift unit 1 to output a scanning signal. At the first time point, one of the first control unit 21 and the second control unit 22 is turned on and another one of the first control unit 21 and the second control unit 22 is turned off. When the first control unit 21 is turned on and the second control unit 22 is turned off, the first control unit 21 controls the shift control signal output by the first shift unit 11 to be transmitted to the second shift unit 12, so that the second shift unit 12 outputs the driving signals in sequence, and the second control unit 22 controls the shift control signal output by the second shift unit 12 to not be transmitted to the third shift unit 13.

The specific working principle of the circuit structure has been described in detail in the above embodiments, which will not be repeated herein.

Based on the above method, the present disclosure can ensure that the functional circuit 3 in the last row of the functional sub-region 4 can achieve its complete function while achieving the control of the sub-region. In the present disclosure, it is not necessary to provide a dummy circuit 10 between two adjacent functional sub-regions 4. In this way, it not only prevents the dummy circuit 10 from occupying the space of the original functional circuit 3, which is beneficial to improve the pixel density, but also avoids a discontinuous image displaying or poor fingerprint recognition accuracy caused by the dummy circuit 10.

In some embodiments, referring to FIG. 11 and FIG. 12, the control circuit 2 includes a third control unit 23. At least one third control unit 23 is electrically connected to the second shift unit 12.

When the first control unit 21 is turned off and the second control unit 22 is turned on, the third control unit 23 is turned on to transmit the frame start signal to the second shift unit 12, so that the second shift unit 12 outputs a driving signal. The second control unit 22 controls the shift control signal output by the second shift unit 12 to be transmitted to the third shift unit 13, so that the third shift unit 13 outputs the driving signals in turn.

The specific working principle of the third control unit 23 has been described in detail in the above embodiments, which will not be repeated herein.

In the above method, the third control unit 23 can be regarded as a gating unit. When the $x^{th}$ functional sub-region 4 is individually controlled, the third control unit 23 electrically connected to the $x^{th}$ shift circuit 5 are turned on, and the frame start signal provided by the frame start line STV is transmitted to the shift circuit 5, thereby triggering the shift circuit 5 to work. With such configuration, multiple third control units 23 is electrically connected to only one frame start signal line STV. Compared to the manner in which each second shift unit 12 is provided with one frame start signal line STV to drive, the number of frame start signal lines STV is reduced.

In some embodiments, referring to FIG. 4, the circuit structure includes multiple circuit groups 9. The circuit group 9 includes multiple functional circuits 3, and the functional circuit 3 is connected to the first driving signal line S1 and the second driving signal line S2. The $i^{th}$ shift unit 1_$i$ is electrically connected to the first driving signal line S1_$i$ electrically connected to the $i^{th}$ circuit group 9 and the second driving signal line S2_$i$–1 electrically connected to the $(i-1)^{th}$ circuit group 9, where i is a positive integer greater than or equal to 2.

When the $i^{th}$ shift unit 1_$i$ outputs the driving signal, it controls the functional circuit 3 in the $(i-1)^{th}$ circuit group 9 to perform the second operation, and controls the functional circuit 3 in the $i^{th}$ circuit group 9 to perform the first operation.

When the functional circuit 3 is the photosensitive circuit 31, it can ensure that the photosensitive circuit 31 of the last row of the functional sub-region 4 can be reset normally, so that the fingerprint recognition of the next frame is not affected, thereby improving the fingerprint recognition accuracy. When the functional circuit 3 is a pixel circuit 32, it can ensure that the last row of pixel circuits 32 of the functional sub-region 4 can write data signals normally, so that the light-emitting elements electrically connected to it can emit light normally, thereby improving the screen continuity between two adjacent functional sub-regions 4, and optimizing the display effect.

Figure 19:
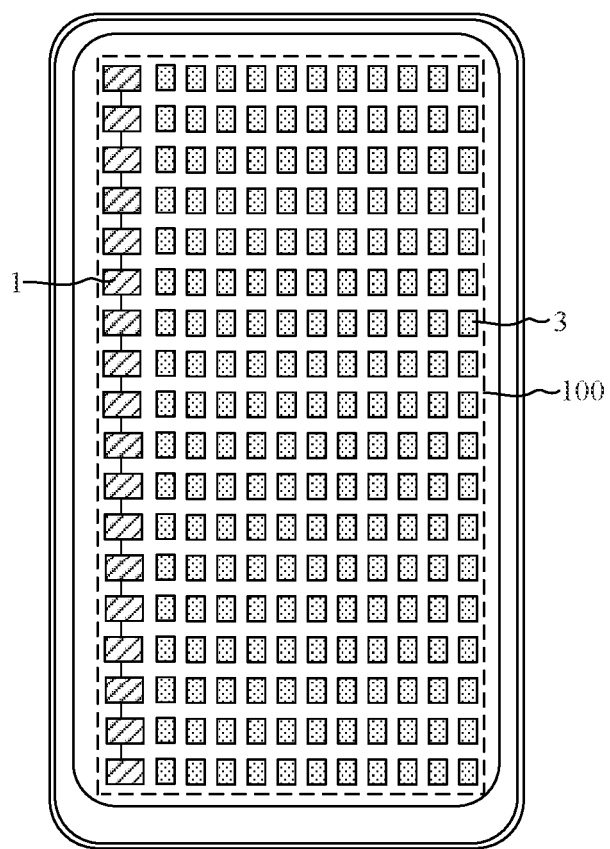
FIG. 19 is a schematic diagram of a display apparatus according to some embodiments of the present disclosure.

The present disclosure provides a display apparatus. FIG. 19 is a schematic diagram of a display apparatus according to some embodiments of the present disclosure. As shown in FIG. 19, the display apparatus includes the above circuit structures 100. The specific structure of the circuit structure 100 has been described in detail in the above embodiments, which will not be repeated herein. It is appreciated that the display apparatus shown in FIG. 19 is only a schematic illustration, which can be any electronic device with a display function, such as a mobile phone, a tablet computer, a laptop computer, an electronic paper book, or a television.

When the functional circuit 3 in the circuit structure includes the photosensitive circuit 31, the display apparatus can include a display module and a fingerprint recognition substrate. The fingerprint recognition substrate is located at a side of the display module facing away a light-emitting direction of the display apparatus. The circuit structure is located in the fingerprint recognition substrate. In order to improve the pixel arrangement density, the fingerprint recognition substrate includes a circuit layer and a photosensitive layer. The photosensitive layer is located at a side of the circuit layer facing towards the display module. The circuit structure is located in the circuit layer. The photosensitive element D1 electrically connected to the photosensitive circuit 31 in the circuit structure is located in in the photosensitive layer.

When the functional circuit 3 in the circuit structure includes a pixel circuit 32, the display apparatus can include a display module. The circuit structure is located in the display module.

The above are merely some embodiments of the present disclosure, which, as mentioned above, are not used to limit the present disclosure. Within the principles of the present disclosure, any modification, equivalent substitution, improvement, etc., shall fall into the scope of the present disclosure.

Finally, it should be noted that the technical solutions of the present disclosure are illustrated by the above embodiments, but not intended to limit thereto. Although the present disclosure has been described in detail, those skilled in the art can understand with reference to the foregoing embodiments that the present disclosure is not limited by the specific embodiments described herein, and can make various obvious modifications, replacements, and substitutions without departing from the scope of the present disclosure.

What is claimed is:

1. A circuit structure, comprising:
   shift units cascaded and comprising a first shift unit, a second shift unit, and a third shift unit; and
   a control circuit comprising a first control unit and a second control unit;
   wherein the first control unit is electrically connected between the first shift unit and the second shift unit, and is configured to control a shift control signal output by the first shift unit to be transmitted to the second shift unit when the first control unit is turned on;
   wherein the second control unit is electrically connected between the second shift unit and the third shift unit, and is configured to control a shift control signal output by the second shift unit to be transmitted to the third shift unit when the second control unit is turned on;
   wherein, at a first time point, one of the first control unit and the second control unit is turned on, and another one of the first control unit and the second control unit is turned off;
   wherein the first control unit comprises a first transistor electrically connected between the first shift unit and the second shift unit;
   the second control unit comprises a second transistor electrically connected between the second shift unit and the third shift unit; and
   at the first time point, one of the first transistor and the second transistor is turned on, and another one of the first transistor and the second transistor is turned off;
   wherein the first transistor and the second transistor are of a same type; and
   at the first time point, one of the first transistor and the second transistor is configured to receive a turn-on level, and another one of the first transistor and the second transistor is configured to receive a turn-off level;
   wherein the first transistor comprises a gate electrode electrically connected to a first control signal line, and the second transistor comprises a gate electrode electrically connected to a second control signal line; and
   wherein the circuit structure comprises at least two shift groups, wherein each group of the at least two shift groups comprises the first shift unit, the second shift unit, and the third shift unit, and at least two shift groups comprise a first shift group and a second shift group;
   the first transistor connected between the first shift unit and the second shift unit in the first shift group is a first A transistor, and the second transistor connected between the second shift unit and the third shift unit in the first shift group is a second A transistor;
   the first transistor connected between the first shift unit and the second shift unit in the second shift group is a first B transistor, and the second transistor connected between the second shift unit and the third shift unit in the second shift group is a second B transistor; and
   the first control signal line electrically connected to the first A transistor is reused as the second control signal line electrically connected to the second B transistor, and the second control signal line electrically connected to the second A transistor is reused as the first control signal line electrically connected to the first B transistor.

2. The circuit structure according to claim 1, wherein the first transistor and the second transistor are of different types; and
   a gate electrode of the first transistor and a gate electrode of the second transistor are electrically connected to a fourth control signal line.

3. The circuit structure according to claim 1, further comprising:
   a dummy unit cascaded with a fourth shift unit, wherein the dummy unit is configured to output a driving signal when the fourth shift unit transmits a shift control signal to the dummy unit, and the fourth shift unit is a last shift unit of the shift units.

4. The circuit structure according to claim 1, wherein the circuit structure further comprises circuit groups, at least one of the circuit groups comprises functional circuits, and each of the functional circuits is electrically connected to both one of first driving signal lines and one of second driving signal lines and is configured to perform a first operation under the first driving signal and perform a second operation under the second driving signal; and
   an $i^{th}$ shift unit of the shift units is electrically connected to one of the first driving signal lines that is electrically connected to an $i^{th}$ circuit group of the circuit groups, and is also connected to one of the second driving signal lines that is electrically connected to an $(i-1)^{th}$ circuit group of the circuit groups, where i is a positive integer greater than or equal to 2.

5. The circuit structure according to claim 4, wherein the one of the first driving signal lines that is electrically connected to the $i^{th}$ circuit group of the circuit groups is reused as the one of the second driving signal lines that is electrically connected to the $(i-1)^{th}$ circuit group of the circuit groups.

6. The circuit structure according to claim 4, wherein one of the functional circuits comprises a photosensitive circuit, the first driving signal lines are read control signal lines, and the second driving signal lines are reset control signal lines; and the photosensitive circuit is configured to perform a read operation under a read control signal and perform a reset operation under a reset control signal.

7. The circuit structure according to claim 4, wherein one of the functional circuits comprises a pixel circuit, the first driving signal lines are first scanning signal lines, and the second driving signal lines are second scanning signal lines; and the pixel circuit is configured to perform a reset operation under a first scanning signal and perform a data writing operation under a second scanning signal.

8. The circuit structure according to claim 1, further comprising:

a first shift circuit configured to drive a first functional sub-region and comprising an $m1^{th}$ shift unit to an $n^{th}$ shift unit of the shift units that are cascaded; and a second shift circuit configured to drive a second functional sub-region and comprising an $(n+1)^{th}$ shift unit to an $m2^{th}$ shift unit of the shift units that are cascaded, wherein the $m1^{th}$ shift unit to the $m2^{th}$ shift unit of the shift units are sequentially cascaded, the $n^{th}$ shift unit is the first shift unit, the $(n+1)^{th}$ shift unit is the second shift unit, and an $(n+2)^{th}$ shift unit is the third shift unit; and the second control unit is directly connected to each of the second shift unit and the third shift unit.

9. A circuit structure, comprising:

shift units cascaded and comprising a first shift unit, a second shift unit, and a third shift unit; and a control circuit comprising a first control unit and a second control unit wherein the first control unit is electrically connected between the first shift unit and the second shift unit, and is configured to control a shift control signal output by the first shift unit to be transmitted to the second shift unit when the first control unit is turned on;

wherein the second control unit is electrically connected between the second shift unit and the third shift unit, and is configured to control a shift control signal output by the second shift unit to be transmitted to the third shift unit when the second control unit is turned on;

wherein, at a first time point, one of the first control unit and the second control unit is turned on, and another one of the first control unit and the second control unit is turned off;

wherein the first control unit comprises a first transistor electrically connected between the first shift unit and the second shift unit;

the second control unit comprises a second transistor electrically connected between the second shift unit and the third shift unit; and at the first time point, one of the first transistor and the second transistor is turned on, and another one of the first transistor and the second transistor is turned off;

wherein the first transistor and the second transistor are of a same type; and at the first time point, one of the first transistor and the second transistor is configured to receive a turn-on level, and another one of the first transistor and the second transistor is configured to receive a turn-off level; and wherein the first transistor comprises a gate electrode electrically connected to a third control signal line, and the second transistor comprises a gate electrode electrically connected to the third control signal line through an inverter.

10. A circuit structure, comprising:

shift units cascaded and comprising a first shift unit, a second shift unit, and a third shift unit; and a control circuit comprising a first control unit and a second control unit;

at least one third control unit, wherein the first control unit is electrically connected between the first shift unit and the second shift unit, and is configured to control a shift control signal output by the first shift unit to be transmitted to the second shift unit when the first control unit is turned on;

wherein the second control unit is electrically connected between the second shift unit and the third shift unit, and is configured to control a shift control signal output by the second shift unit to be transmitted to the third shift unit when the second control unit is turned on;

wherein, at a first time point, one of the first control unit and the second control unit is turned on, and another one of the first control unit and the second control unit is turned off;

wherein one of the at least one third control unit is electrically connected to the second shift unit, and is configured to be turned on to transmit a frame start signal to the second shift unit when the second control unit is turned on;

wherein the third control unit comprises a third transistor electrically connected between a frame start signal line and the second shift unit; and wherein the second control unit comprises a second transistor electrically connected between the second shift unit and the third shift unit; and the second transistor and the third transistor are of a same type, and a gate electrode of the second transistor and a gate electrode of the third transistor are electrically connected to a fifth control signal line.

11. A method for driving a circuit structure according to claim 1, wherein the method comprises:

controlling the shift units to output scanning signals, wherein at a first time point, one of the first control unit and the second control unit is turned on, and another one of the first control unit and the second control unit is turned off; and wherein when the first control unit is turned on and the second control unit is turned off, the first control unit is configured to control the shift control signal output by the first shift unit to be transmitted to the second shift unit in such a manner that the second shift unit outputs a driving signal in turn, and the second control unit is configured to control the shift control signal output by the second shift unit not to be transmitted to the third shift unit.

12. The method according to claim 11, wherein the control circuit further comprises at least one third control unit, one of the at least one third control unit is electrically connected to the second shift unit; and when the first control unit is turned off and the second control unit is turned on, the one of the at least one third control unit is turned on to transmit a frame start signal to the second shift unit in such a manner that the second shift unit outputs a driving signal, the second control unit is configured to control the shift control signal output by the second shift unit to be transmitted to the one third shift unit in such a manner that the one third shift unit outputs a driving signal in turn.

13. The method according to claim 11, wherein the circuit structure further comprises circuit groups, the circuit groups comprise functional circuits, each of the functional circuits is electrically connected to one of first driving signal lines and one of second driving signal lines, wherein an $i^{th}$ shift unit of the shift units is electrically connected to one of the first driving signal lines that is electrically connected to an $i^{th}$ circuit group of the circuit groups, and the $i^{th}$ shift unit is also connected to one of the second driving signal lines that is electrically connected to an $(i-1)^{th}$ circuit group of the circuit groups, where i is a positive integer greater than or equal to 2; and when the $i^{th}$ shift unit outputs a driving signal, one of the functional circuits in the $(i-1)^{th}$ circuit group is configured to perform a second operation, and one of the functional circuits in the $i^{th}$ circuit group is configured to perform a first operation.

14. The method according to claim 11, wherein the circuit structure further comprises:

a first shift circuit configured to drive a first functional sub-region and comprising an $m1^{th}$ shift unit to an $n^{th}$ shift unit of the shift units that are cascaded; and a second shift circuit configured to drive a second functional sub-region and comprising an $(n+1)^{th}$ shift unit to an $m2^{th}$ shift unit of the shift units that are cascaded, wherein the $m1^{th}$ shift unit to the $m2^{th}$ shift unit of the shift units are sequentially cascaded, the $n^{th}$ shift unit is the first shift unit, the $(n+1)^{th}$ shift unit is the second shift unit, and an $(n+2)^{th}$ shift unit is the third shift unit; and the second control unit is directly connected to each of the second shift unit and the third shift unit.

15. A display apparatus comprising the circuit structure according to claim 1.

16. The display apparatus according to claim 15, wherein the circuit structure further comprises:

a first shift circuit configured to drive a first functional sub-region and comprising an $m1^{th}$ shift unit to an $n^{th}$ shift unit of the shift units that are cascaded; and a second shift circuit configured to drive a second functional sub-region and comprising an $(n+1)^{th}$ shift unit to an $m2^{th}$ shift unit of the shift units that are cascaded, wherein the $m1^{th}$ shift unit to the $m2^{th}$ shift unit of the shift units are sequentially cascaded, the $n^{th}$ shift unit is the first shift unit, the $(n+1)^{th}$ shift unit is the second shift unit, and an $(n+2)^{th}$ shift unit is the third shift unit; and the second control unit is directly connected to each of the second shift unit and the third shift unit.

* * * * *